United States Patent
White

(10) Patent No.: US 12,099,938 B2
(45) Date of Patent: Sep. 24, 2024

(54) CONTEXTUAL SKILLS DISCOVERY

(71) Applicant: Microsoft Technology Licensing, LLC, Redmond, WA (US)

(72) Inventor: Ryen William White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2121 days.

(21) Appl. No.: 15/692,701

(22) Filed: Aug. 31, 2017

(65) Prior Publication Data

US 2019/0065975 A1  Feb. 28, 2019

(51) Int. Cl.
| | |
|---|---|
| G06N 5/047 | (2023.01) |
| G06F 7/08 | (2006.01) |
| G06N 20/00 | (2019.01) |
| G06Q 30/0251 | (2023.01) |
| G06Q 30/0282 | (2023.01) |
| G06Q 30/0601 | (2023.01) |
| G06Q 50/10 | (2012.01) |

(52) U.S. Cl.
CPC ............. *G06N 5/047* (2013.01); *G06F 7/08* (2013.01); *G06N 20/00* (2019.01); *G06Q 30/0251* (2013.01); *G06Q 30/0282* (2013.01); *G06Q 50/10* (2013.01); *G06Q 30/0631* (2013.01); *G06Q 30/0641* (2013.01)

(58) Field of Classification Search
CPC ........ G06N 5/047; G06N 20/00; G06Q 50/10; G06Q 30/0282; G06Q 30/0251; G06Q 30/0631; G06Q 30/0641; G06F 7/08
See application file for complete search history.

(56) References Cited

U.S. PATENT DOCUMENTS 8,731,942 B2 * 5/2014 Cheyer ................... G10L 15/26
704/275
8,972,397 B2   3/2015 Imig et al.
(Continued)

FOREIGN PATENT DOCUMENTS

WO    2016168811 A1    10/2016

OTHER PUBLICATIONS

"Sent2Vec", Retrieved From <<https://www.microsoft.com/en-us/download/details.aspx?id=52365>>, Dec. 5, 2016, 3 Pages.
Chapelle, et al., "A Dynamic Bayesian Network Click Model for Web Search Ranking", In Proceedings of the 18th International Conference on World Wide Web, Apr. 20, 2009, 10 Pages.
(Continued)

*Primary Examiner* — Kakali Chaki
*Assistant Examiner* — Ababacar Seck

(57) ABSTRACT

Recommending one or more relevant skills to a user that are appropriate for the user's current context is provided. A machine learning contextual skills model is trained on data associated with skills that are invoked by the particular user and by various users and context data that defines characteristics of the context of the users, the users' computing devices, and the users' environments in association with the invoked skills. Responsive to a trigger event associated with the user and a computing device, current context data and user data is collected and passed to the contextual skills system. The contextual skills model is applied to the collected data and generates a ranked list of skills. One or more top-ranking skills are selected and provided to the user as one or more skill recommendations that are determined to be relevant to the user and relevant to the user's current context.

20 Claims, 10 Drawing Sheets

(56) References Cited

U.S. PATENT DOCUMENTS

| | | | |
|---|---|---|---|
| 9,665,652 | B2 | 5/2017 | Agarwal et al. |
| 9,680,945 | B1* | 6/2017 | Treves ..................... G09B 7/04 |
| 2003/0182394 | A1* | 9/2003 | Ryngler ................ H04W 4/029 709/217 |
| 2006/0136409 | A1* | 6/2006 | Leidig ..................... G06F 9/453 |
| 2008/0288430 | A1* | 11/2008 | Friedlander ......... G06F 16/2462 706/46 |
| 2009/0276231 | A1* | 11/2009 | Bazigos ............... G06Q 10/105 705/320 |
| 2012/0016678 | A1* | 1/2012 | Gruber ................... G06F 40/30 704/275 |
| 2012/0197733 | A1* | 8/2012 | Skomoroch ........... G06F 16/355 705/14.66 |
| 2013/0204813 | A1 | 8/2013 | Master et al. |
| 2014/0032572 | A1* | 1/2014 | Eustice ................. G06F 16/955 707/748 |
| 2014/0171039 | A1* | 6/2014 | Bjontegard ............. H04L 67/38 455/414.1 |
| 2014/0324721 | A1* | 10/2014 | Rennison ........... G06Q 50/2057 705/321 |
| 2015/0161566 | A1* | 6/2015 | Cai .................... G06Q 10/1053 705/321 |
| 2015/0317582 | A1* | 11/2015 | Nath ................ G06Q 10/06311 705/7.13 |
| 2015/0379406 | A1 | 12/2015 | Savage et al. |
| 2016/0098992 | A1 | 4/2016 | Renard et al. |
| 2017/0041388 | A1* | 2/2017 | Tal ........................ G06F 40/279 |
| 2017/0169532 | A1* | 6/2017 | Appel ............... G06F 16/24578 |

OTHER PUBLICATIONS

Dupret, et al., "A User Browsing Model to Predict Search Engine Click Data from Past Observations", In Proceedings of the 31st annual international ACM SIGIR conference on Research and development in information, Jul. 20, 2008, 8 Pages.

Hempel, Jessi, "Facebook Launches M, Its Bold Answer to Siri and Cortana", Retrieved from <<https://www.wired.com/2015/08/facebook-launches-m-new-kind-virtual assistant/>>, Aug. 26, 2015, 12 Pages.

Richardson, et al., "Predicting Clicks: Estimating the Click-Through Rate for New Ads", In Proceedings of the 16th International Conference on World Wide Web, May 8, 2007, pp. 521-529.

White, et al., "Predicting User Interests from Contextual Information", In Proceedings of the 32nd international ACM SIGIR conference on Research and development in information retrieval, Jul. 19, 2009, pp. 363-370.

Woerndl, et al., "Context-Aware Recommendations in Decentralized, Item-Based Collaborative Filtering on Mobile Devices", In International Conference on Mobile Computing, Applications, and Services, Oct. 26, 2009, pp. 383-392.

"Revision #11—TechNet Articles—United States (English)—TechNet Wiki", Retrieved from: https://social.technet.microsoft.com/wiki/contents/articles/36688.introduction-to-cortana-intelligence-suite/revision/12.aspx, Feb. 7, 2017, 5 Pages.

"International Search Report and Written Opinion Issued in PCT Application No. PCT/US18/038718", Mailing Date: Sep. 10, 2018, 13 Pages.

Ruhi, Sarikaya, "The Technology Behind Personal Digital Assistants: An overview of the system architecture and key component", In the Proceeding of Signal Processing Magazine, vol. 34, Issue 1, Jan. 11, 2017, 15 Pages.

* cited by examiner

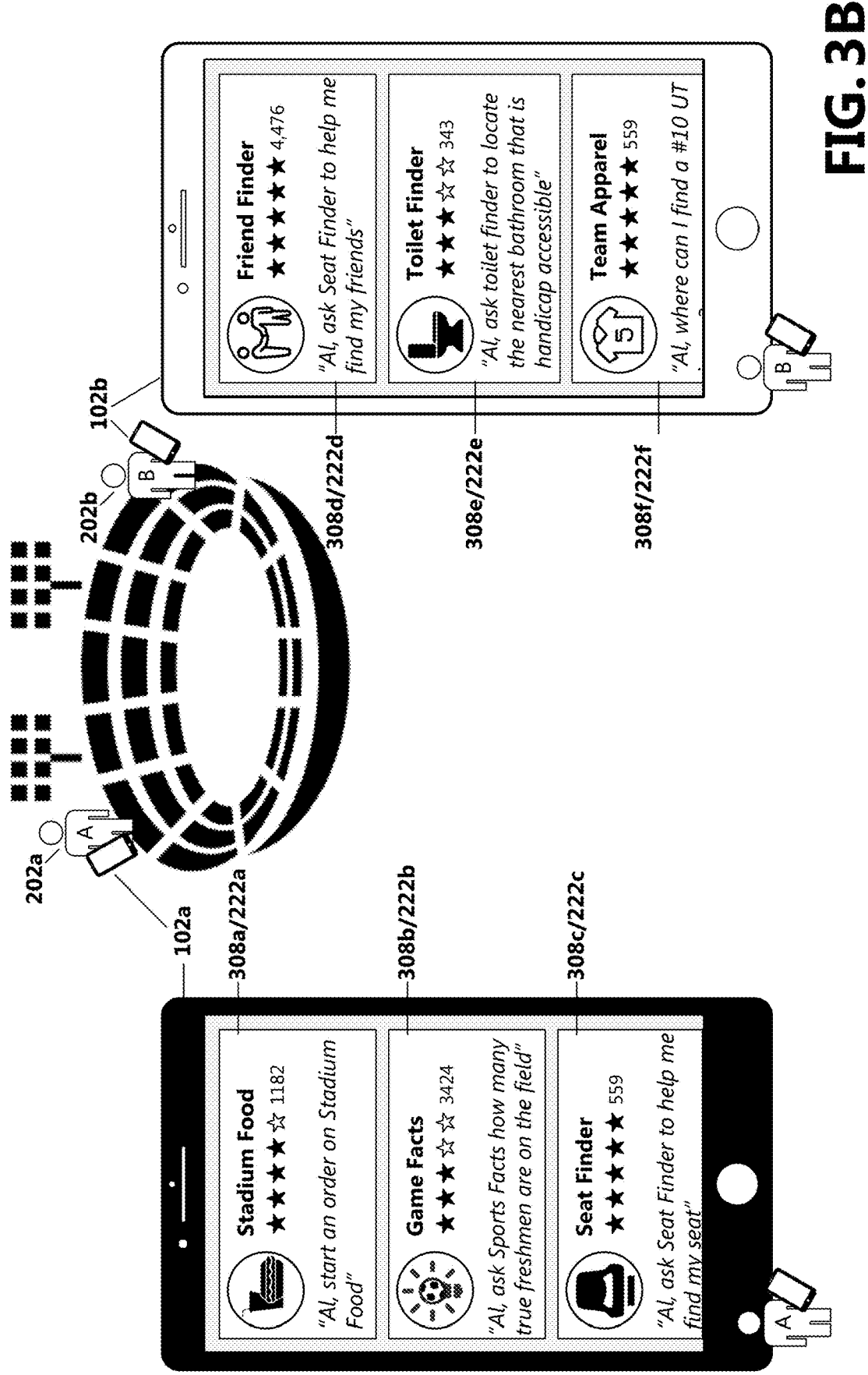

CONTEXTUAL SKILLS DISCOVERY

BACKGROUND

Digital personal assistant technology is increasingly being incorporated into a variety of computing devices. Such technology is typically powered by artificial intelligence algorithms, and is used to perform tasks or to provide users with a wide variety of services. Acceleration in computing power and storage has enabled the collection and mining of huge data sets, which in addition to advances in fields of deep learning and neural networks, enables developers to continually develop and implement a growing list of digital personal assistant capabilities.

However, some digital personal assistant capabilities may not be intuitively obvious, and thus, users may not be aware of them. Helping a user understand features and functionalities of a digital personal assistant can be challenging, particularly on an audio device that does not have a screen. A user of such a device may be reduced to a "guess and try" interaction style, where the user asks a question and randomly tries certain commands or interactions to puzzle out what works. Further, conveying functionalities and capabilities that are relevant to a user can be challenging.

SUMMARY

This Summary is provided to introduce a selection of concepts in a simplified form that are further described below in the Detailed Description section. This Summary is not intended to identify key features or essential features of the claimed subject matter, nor is it intended as an aid in determining the scope of the claimed subject matter.

Aspects are directed to an automated system, method, and computer readable storage device for notifying a user of one or more skills appropriate for the user's current context. A contextual skills system aggregates data associated with various skills that are invoked by a particular user and by various users, as well as context data that define characteristics of the context of the users, the users' computing devices, and the users' environments in association with the invoked skills. A machine learning algorithm is applied to the collected data for learning and understanding patterns associated with skills invoked by users and the users' contexts, and for generating a machine learning contextual skills model that captures the identified patterns.

Responsive to a trigger event associated with a user and a computing device, current context data and user data are collected and passed to the contextual skills system. The contextual skills model is applied to the collected data and generates a ranked list of skills. One or more top-ranking skills are selected and provided to the user as one or more skill recommendations that are determined to be relevant to the user and relevant to the user's current context.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following Detailed Description and a review of the associated drawings. It is to be understood that the following Detailed Description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3A and 3B are illustrations of an example use case;

DETAILED DESCRIPTION

Figure 1:
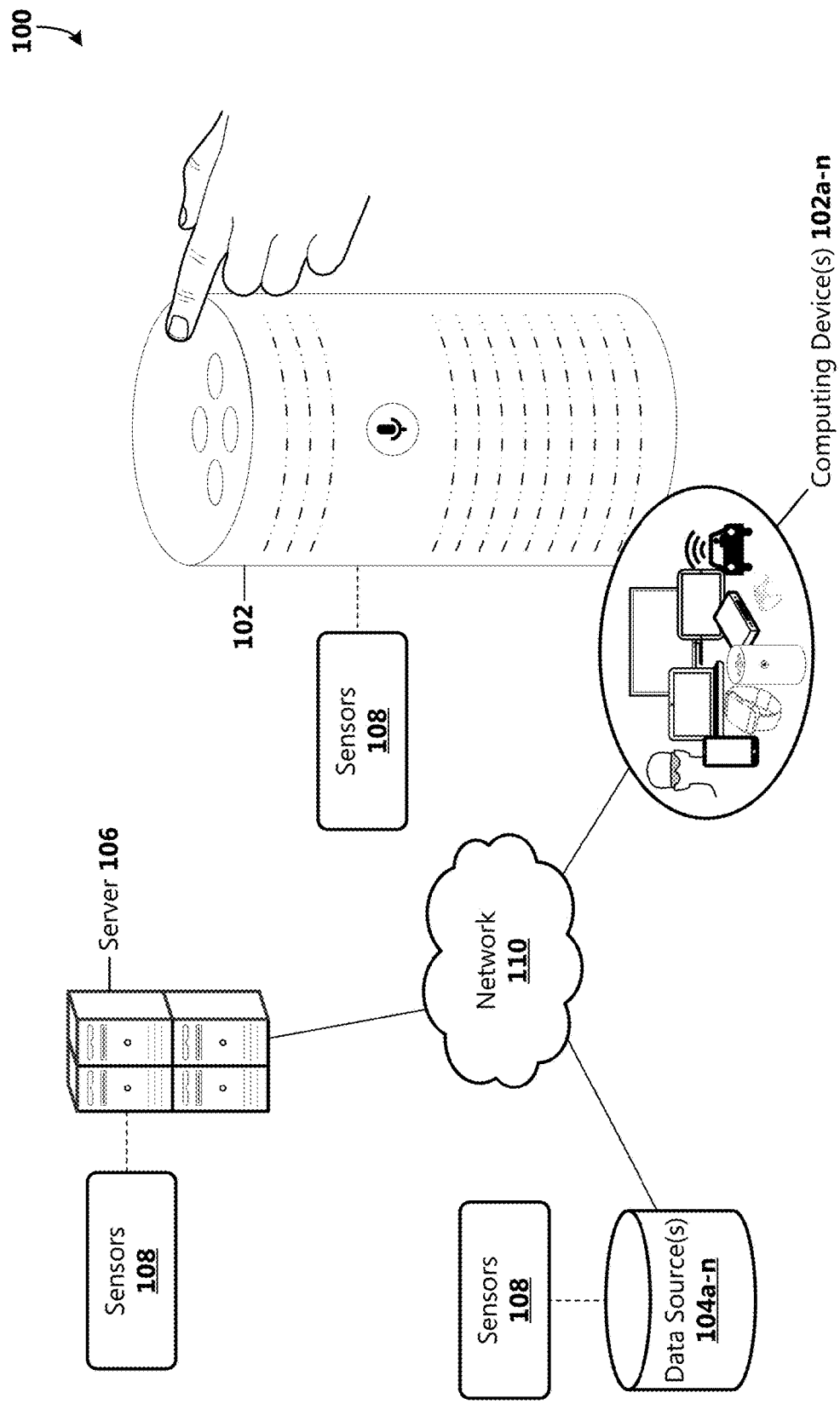
FIG. 1 is a block diagram showing an example operating environment for implementing aspects of the present disclosure.

The following Detailed Description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following Detailed Description is not limiting, but instead, the proper scope is defined by the appended claims. Examples may take the form of a hardware implementation, or an entirely software implementation, or an implementation combining software and hardware aspects. The following Detailed Description is, therefore, not to be taken in a limiting sense.

Aspects of the present disclosure are directed to a method, system, and computer readable storage device for notifying a user of one or more skills appropriate for the user's current context. Advantageously, the disclosed aspects enable the benefit of technical effects that include, but are not limited to, an improved user experience and a reduction of processing resources and bandwidth resources. For example, available skills and functionalities that are relevant to the user and appropriate for the user's current context are automatically discovered and presented to the user, addressing a cold-start issue, where the user may not be aware of the available skills and functionalities. Such skills and functionalities can provide positive user experiences and, in some examples, can provide the user with services that are more conservative of the user's computing device resources, such as memory, processing resources, and bandwidth resources. Further, the user does not need to use computing resources for manually searching for a desired skill that is appropriate for the user's current context.

With reference now to FIG. 1, a block diagram is provided showing an example operating environment 100 in which aspects of the present disclosure can be employed. It should be understood that this and other arrangements described herein are provided as examples. Other arrangements and elements can be used in addition to or instead of those shown in FIG. 1. Various functions described herein as being performed by one or more elements or components can be carried out by hardware, firmware, and/or software. For example, some functions can be carried out by a processor executing instructions stored in memory. As illustrated, the example operating environment 100 includes one or a plurality of client computing devices 102*a-n* (generally 102), a number of data sources 104*a-n* (generally 104), at least one server 106, various sensors 108, and network 110. Each of the components illustrated in FIG. 1 can be implemented via any type of computing device, such as the computing devices described in reference to FIGS. 5, 6A, 6B, and 7. As an example, the one or more client computing devices 102 can be one or more of various types of computing devices, such as tablet computing devices, desktop computers, mobile communication devices, laptop computers, laptop/tablet hybrid computing devices, speaker devices, large screen multi-touch displays, vehicle computing systems, gaming devices, smart televisions, wearable devices, internet of things (IoT) devices, etc.

The one or more client computing devices 102, data sources 104, and servers 106 can communicate with each other via network 110, which can include, without limitation, one or more local area networks (LANs) or wide area networks (WANs). In some examples, network 110 comprises the Internet and/or a cellular network, amongst any of a variety of possible public or private networks. The sensors 108 can be integrated with or communicatively attached to one or more computing devices, such as one or more client computing devices 102, servers 106, or data sources 104. The sensors 108 can be embodied as hardware, software, or a combination of hardware and software, and are operative or configured to sense, detect, or otherwise obtain user data (e.g., user ID data, user profile data, user preferences) or context data.

Context data can include, for example: location information of a client computing device 102; properties or characteristics of the client computing device(s) 102 (such as device state, charging data, date/time, or other information derived from the client computing device 102); and user interaction information (e.g., application usage, online activity, searches, voice data such as automatic speech recognition, activity logs, communications data including calls, texts, instant messages, and emails, web site posts, and other user data associated with communication events). In some examples, user interaction information includes information associated user interactions that occur over more than one client computing device 102. Context data can further include user history, session logs, application data, contacts data, calendar and schedule data, notification data, social-network data, news (including weather emergencies, local, national, or global crises, and popular or trending items on search engines or social networks), online gaming data, ecommerce activity, user-account(s) data (which can include data from user preferences or settings associated with a digital personal assistant 206 or service), home-sensor data, appliance data, global positioning system (GPS) data, vehicle signal data, traffic data, weather data, wearable device data, other user device data (which may include device settings, profiles, network-related information (e.g., network name or ID, domain information, workgroup information, connection data, wireless network data, or configuration data, data regarding the model number, firmware, or equipment, device pairings, or other network-related information)), gyroscope data, accelerometer data, payment or credit card usage data, purchase history data, or other sensor data that may be sensed or otherwise detected by a sensor 108 (or other detector) component(s). For example, other sensor data can include data derived from a sensor component associated with the user 202 (including location, motion, orientation, position, user-access, user interactions, network-access, user device charging, or other data that is capable of being provided by one or more sensors), and other sources of data that can be sensed or determined as described herein. In some examples, context data includes attributes of a trigger event or a user request, such as attributes (e.g., emotion, gender, education level) that are detectable from prosody and other elements of speech, wording of a user request, etc. For example, voice analysis can be applied to a user request for detecting the user's emotional state, which can be used for prioritizing certain skills 222 to recommend to the user 202.

According to an aspect, the one or more data sources 104 can comprise data sources or data systems that are configured to make data available to any of the various components of operating environment 100 or of the example contextual skills system 200 described below with reference to FIG. 2. In some examples, the one or more data sources 104 are discrete from the one or more client computing devices 102 and the at least one or more servers 106. In other examples, the one or more data sources 104 are incorporated or integrated into at least one of the client computing devices 102 or servers 106. As should be appreciated, any number of client computing devices 102, data sources 104, servers 106, and sensors 108 can be employed within the example operating environment 100 within the scope of the present disclosure. Each can comprise a single device or a plurality of devices cooperating in a distributed environment. For example, the server 106 can be provided via multiple devices arranged in a distributed environment that collectively provide various functionalities described herein. In some examples, other components not shown can be included within the distributed operating environment 100.

Figure 2:
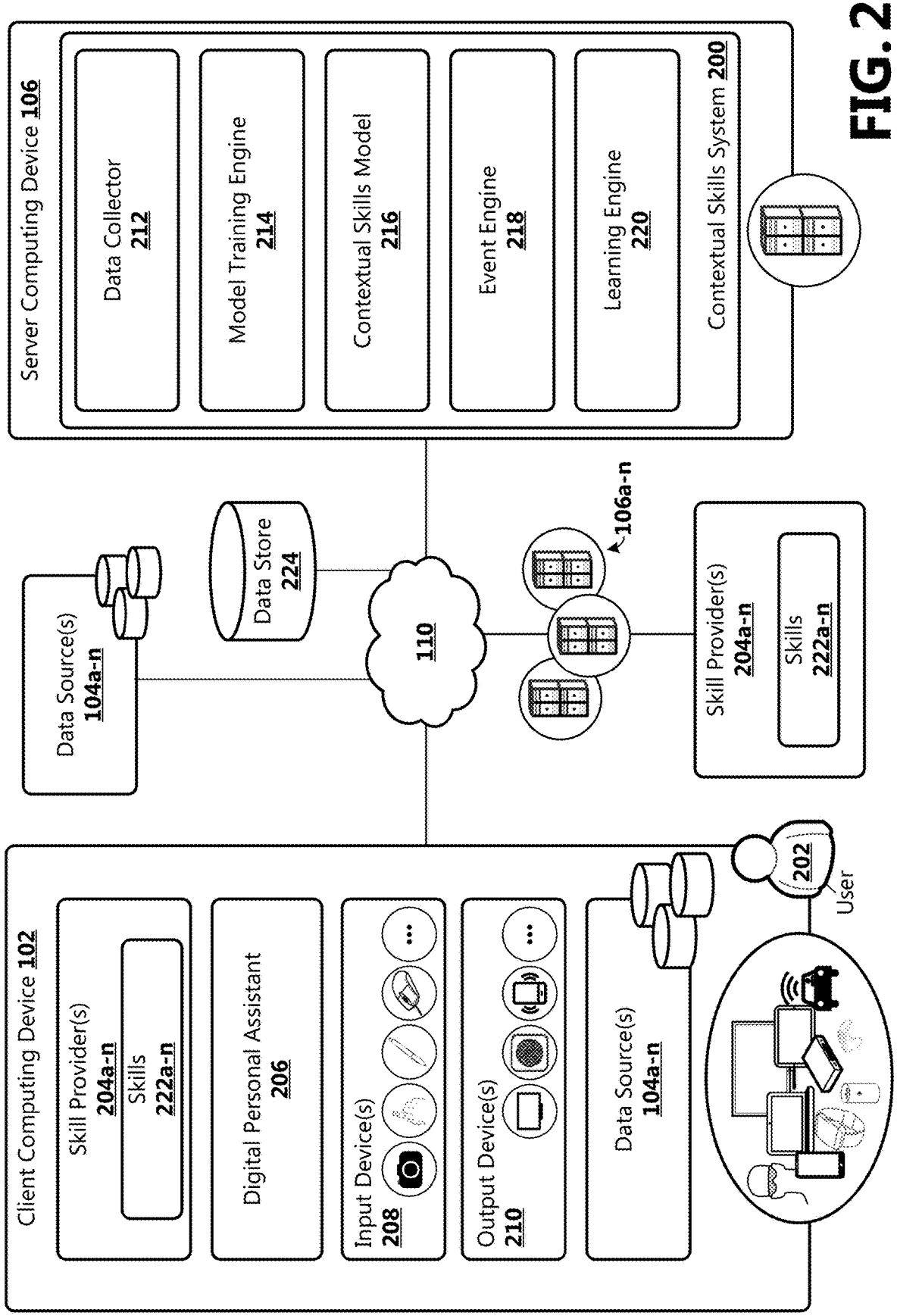
FIG. 2 is a block diagram showing an example computing architecture for implementing aspects of the present disclosure.

With reference now to FIG. 2, an example computing architecture is shown for implementing aspects of the present disclosure. For example, the example computing architecture can be used to implement one or more of the components of a contextual skills system 200, including components for training a contextual skills model 216 and using the contextual skills model 216 for notifying a user 202 of one or more digital personal assistant associated skills 222*a-n* (generally, 222) appropriate for the user's current context based on collected and detected context information.

According to aspects, the client computing device 102 includes a user interface system, which can include input/output (I/O) devices and components that enable communication between the user 202 and the computing device. For example, the user interface system can include one or more input devices 208, such as mouse pointer used to interact with a graphical user interface (GUI) displayed by display screen, a keyboard, a motion sensor, a gesture sensor, a microphone for voice input, a touchscreen, a camera for image input, physical buttons, etc. For example, the client computing device 102 can receive input from the user 202, such as text input, drawing input, inking input, selection input, etc., via various input methods, such as those relying on mice, keyboards, and remote controls, as well as Natural User Interface (NUI) methods, which enable the user 202 to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user interface system can also include one or more output devices 210, such as display screen(s), speakers, haptic devices for tactile feedback, and other types of output devices. In certain cases, an input device 208 and an output device 210 can be combined in a single device, such as a touchscreen display which both depicts images and receives touch gesture input from the user 202.

According to an aspect, the client computing device 102 includes or is communicatively attached to at least one digital personal assistant 206. Digital personal assistant functionality can be provided as or by a stand-alone digital personal assistant application, part of an application, or part of an operating system of the client computing device 102. In some examples, the at least one digital personal assistant 206 employs an NUI that can receive spoken utterances from the user 202 that are processed with voice or speech recognition technology. The at least one digital personal assistant 206 can support various functionalities and skills 222a-n (generally 222) provided by one or more skill providers 204a-n (generally, 204). In any of the examples herein, a skill provider 204 can take a variety of forms, including a local application, a remote (e.g., web-based) application or service, a skill store, or the like. In various examples, skills 222 include functionalities provided via third-party developers.

Various skills 222 supported by digital personal assistants 206 can provide functionalities such as: interacting with the user 202 (e.g., through the natural language UI or GUIs); performing tasks (e.g., making note of appointments in the user's calendar, sending messages and emails); providing services (e.g., answering questions from the user 202, mapping directions to a destination, other application or service functionalities that are supported by the digital personal assistant 206); gathering information (e.g., finding information requested by the user 202 about a book or movie, locating the nearest Italian restaurant); operating the client computing device 102 (e.g., setting preferences, adjusting screen brightness, turning wireless connections on and off); and various other functionalities and skills 222. For example, skills 222 can include entertainment-related skills, productivity-related skills, finance-related skills, relaxation-related skills, news and information-related skills, smart home-related skills, health and fitness-related skills, music-related skills, food and drink-related skills, education-related skills, travel-related skills, and the like. The skills 222 listed above are not intended to be exhaustive and other functionalities can be provided by the digital personal assistant 206.

The contextual skills system 200 illustrated in FIG. 2 represents only one example of a suitable computing system architecture. Other arrangements and elements can be used in addition to or instead of the elements shown. As should be appreciated, elements described herein are functional entities that can be implemented as discrete or distributed components, or in conjunction with other components, and in any suitable combination or location. In some examples, the contextual skills system 200 is exposed to users 202 via an API (Application Programming Interface).

As illustrated, the example contextual skills system 200 includes a data collector 212, a model training engine 214, a contextual skills model 216, an event engine 218, and a learning engine 220. The components of the contextual skills system 200 can operate on one or more servers 106, can be distributed across one or more client computing devices 102 and servers 106, or can be implemented in the cloud. In some examples, one or more of the components of the example contextual skills system 200 are distributed across network 110.

According to an aspect, the data collector 212 is illustrative of a software module, software package, system, or device operative or configured to capture logs of skills 222 that have been invoked by the user 202 and by other users. The data collector 212 is further operative or configured to capture logs of context data associated with the invoked skills 222. For example, when a skill 222 is invoked by a user 202, context data are captured and collected via various sensors 108. In various examples, captured logs of invoked skills 222 and associated context data are stored in one or more data stores 224, where the information can be available to the data collector 212 and other components of the contextual skills system 200. For example, a user 202 may invoke a particular skill 222 via a client computing device 102, and context data related to the user's location, date and time information, the type of device on which the skill 222 is invoked, the user's activity, the user's emotional state (e.g., as detected via voice analysis, facial analysis), etc., can be captured and stored. The data collector 212 retrieves captured logs of invoked skills 222 and associated context data, and maps the skills 222 to particular contexts, for example, based on user identification (ID), time, or other factors. In some examples, the data collector 212 is further operative or configured to retrieve user data associated with a user 202 of an invoked skill 222 from one or more data sources 104. As should be appreciated, invoked skills data, context data, and user data are monitored/tracked with notice to the user 202 and with the user's consent.

According to an aspect, the contextual skills system 200 includes a model training engine 214, illustrative of a software module, software package, system, or device operative or configured to train a machine learning (ML) contextual skills model 216. For example, the model training engine 214 comprises an ML algorithm, and provides the algorithm with the invoked skills data, context data, and user data accumulated by the data collector 212 from which to learn. According to an aspect, the model training engine 214 applies machine learning, statistical analysis, behavioral analytics, and data mining techniques to the data, wherein for each invoked skill 222 included in the invoked skills data, the invoked skill 222 is a target attribute, and the model training engine 214 finds patterns in the context data and user data that map input data attributes (e.g., context data attributes and user data attributes) to the target attribute (i.e., the invoked skill 222) and outputs the contextual skills model 216 that captures the identified patterns. In some examples, in training the contextual skills model 216, the model training engine 214 identifies matches between skill metadata (e.g., skill name and skill description) and textual features representing aspects of the user's context (e.g., the name of a location of the user 202, the subject of a meeting). For example, a word embedding can be moved from a lexical match to a semantic match.

According to an aspect, the contextual skills model 216 is operative or configured to make predictions on captured context data and user data for which an invoked skill 222 (i.e., target attribute) is not known. That is, the model training engine 214 trains the contextual skills model 216 to predict a skill 222 that a particular user 202 is likely to invoke and use based on the context that the user 202 is in (e.g., time, day, location, in a meeting, performing an active task). According to an aspect, the model training engine 214 is further operative or configured to train the contextual skills model 216 to identify skills 222 that a particular user 202 is likely to not invoke or use based on a current context. For example, a particular skill 222 can be identified as a skill 222 that would be relevant to a particular user 202, but not in a context that the user 202 is in (e.g., the user 202 may have an interest in cooking; however, a cooking-related skill can be determined to be a skill that the user 202 is not likely to invoke when context data indicates that the user 202 is driving a car).

In some examples, the model training engine 214 is further operative or configured to train the contextual skills model 216 to predict a skill 222 that a user 202 is likely to invoke based on patterns detected in a general population of users. In some examples, the model training engine 214 is further operative or configured to train the contextual skills model 216 to predict a skill 222 that a particular user 202 is likely to invoke and use based at least in part on cohort analysis, wherein a cohort is a group of users who share at least one common characteristic. For example, rather than looking at each user 202 as a single unit, the model training engine 214 breaks users into related groups or cohorts for analysis. Users 202 can be grouped into a cohort based on information available in user data or a combination of user data and context data. As stated above, user data and context data are monitored/tracked with notice to users 202 and with the users' consent. For example, a cohort can be based on one or a combination of age, gender, income, nationality, common interest(s) (e.g., explicitly defined or implicitly defined), career, education level, etc. The characteristics listed above are intended to be examples, and are not exhaustive of the various characteristics and characteristic combinations that can be used to form a cohort. According to an aspect, cohort analysis enables the model training engine 214 to train the contextual skills model 216 to identify relationships between characteristics of a cohort (i.e., group of users 202) and the cohort's/group's behavior with respect to invoking skills 222. In various examples, the contextual skills model 216 is operative or configured to identify relationships between characteristics of a cohort and the cohort's behavior with respect to invoking skills 222 in particular contexts.

The contextual skills system 200 further comprises an event engine 218, illustrative of a software module, software package, system, or device operative or configured to receive an indication of an event corresponding to a request for a recommended skill(s) 222 that are relevant to the user 202 and appropriate for the user's current context. For example, the event operates as a signal to collect available skills data, context data, and user data for feeding into the contextual skills model 216 for determining and providing one or more skill recommendations to the user 202. Accordingly, the user 202 is enabled to discover digital virtual assistant capabilities and skills 222 in a current context.

In some examples, the event corresponding to a contextual skill recommendation is an explicit user request. For example, the explicit user request can be a spoken utterance, typed text, a selection of a button or GUI element, a touch on a touch sensitive surface or control, a gesture, shaking the client computing device 102, or other event that corresponds to a request for recommending one or more skills 222 that are relevant to the user 202 and appropriate for the user's current context. Responsive to receiving an indication of a contextual skills request via a detected event, the event engine 218 notifies the data collector 212 to collect data associated with available skills 222 (e.g., provided by various skill providers 204), context data (e.g., date and time information, location information, the user's recent online activity, the user's emotional state, etc.) associated with the user's current context, and user data. According to an aspect, an available skill 222 includes skills 222 that are already enabled on the user's client computing device 102, digital personal assistant related skills that are available in a skill store, and skills 222 that are otherwise discoverable and able to be accessed and enabled on the user's client computing device 102. The collected data are applied to the ML contextual skills model 216, and a score is calculated for each available skill 222 that is indicative of a level of relevance of each skill 222 to the user 202 for the current context. For example, available skills 222 can include skills 222 provided by one or more skill providers 204, (e.g., local applications, remote (e.g., web-based) applications or services, or the like)). In some examples, the calculated score is based in part on attributes of the contextual skills request (e.g., emotion, gender, education level) that are detectable from prosody and other elements of speech, wording of a user request, etc. For example, the user's detected emotional state can be used for prioritizing certain skills 222 to recommend to the user 202 (e.g., skills 222 that are simpler, skills 222 that are less cognitively demanding, skills 222 that have an option to escalate to a human interaction). As another example, an urgency factor can be determined from voice analysis of an explicit request embodied as a spoken utterance or from natural language processing of a text-based request, and used for prioritizing certain skills 222 to recommend to the user 202. In some examples, the calculated score is based in part on collected quality data, such as user reviews, business bureau ratings, etc. According to an aspect, the contextual skills model 216 is operative or configured to output a ranked list of skills 222, and one or more top ranking skills 222 are provided to the user 202 (e.g., via an audio channel, displayed on a screen, or passed to a companion device).

In other examples, the event corresponding to a contextual skill recommendation is an external event, such as a meeting, breaking news (e.g., weather emergency, local, national, or global crisis), popular or trending items on search engines or social networks, etc. In other examples, the event corresponding to a contextual skill recommendation is an inferred request based on captured information, such as application usage, online activity, a search query, etc. In other examples, the event corresponding to a contextual skill recommendation is the user's current context (e.g., the user's location, the date, the time of day, interaction with a particular person). As should be appreciated, other event types are possible and are within the scope of the present disclosure. According to an aspect, a contextual skill recommendation can be provided to a user 202 proactively, for example, without an explicit user request. In some examples, a skill 222 is provided to a user 202 proactively based on a determined level of importance (e.g., in an emergency or crisis scenario) of the particular skill 222 based on the user's context.

According to an aspect, the contextual skills system 200 further comprises a learning engine 220, illustrative of a software module, software package, system, or device operative or configured to receive feedback associated with user interactions with skills 222 recommended to users 202, for example, for learning which skills 222 are relevant to a particular user 202 or to a cohort in certain contexts. For example, the learning engine 220 can analyze data associated with invoked skills 222 to determine which skills 222 recommended to the user 202 are used and which recommended skills 222 are not used. The learning engine 220 is further operative or configured to feed the identified information and collected context data and user data to the contextual skills model 216 for learning new user and cohort patterns and for adjusting existing user and cohort patterns based on a growing data set.

Figure 3A:
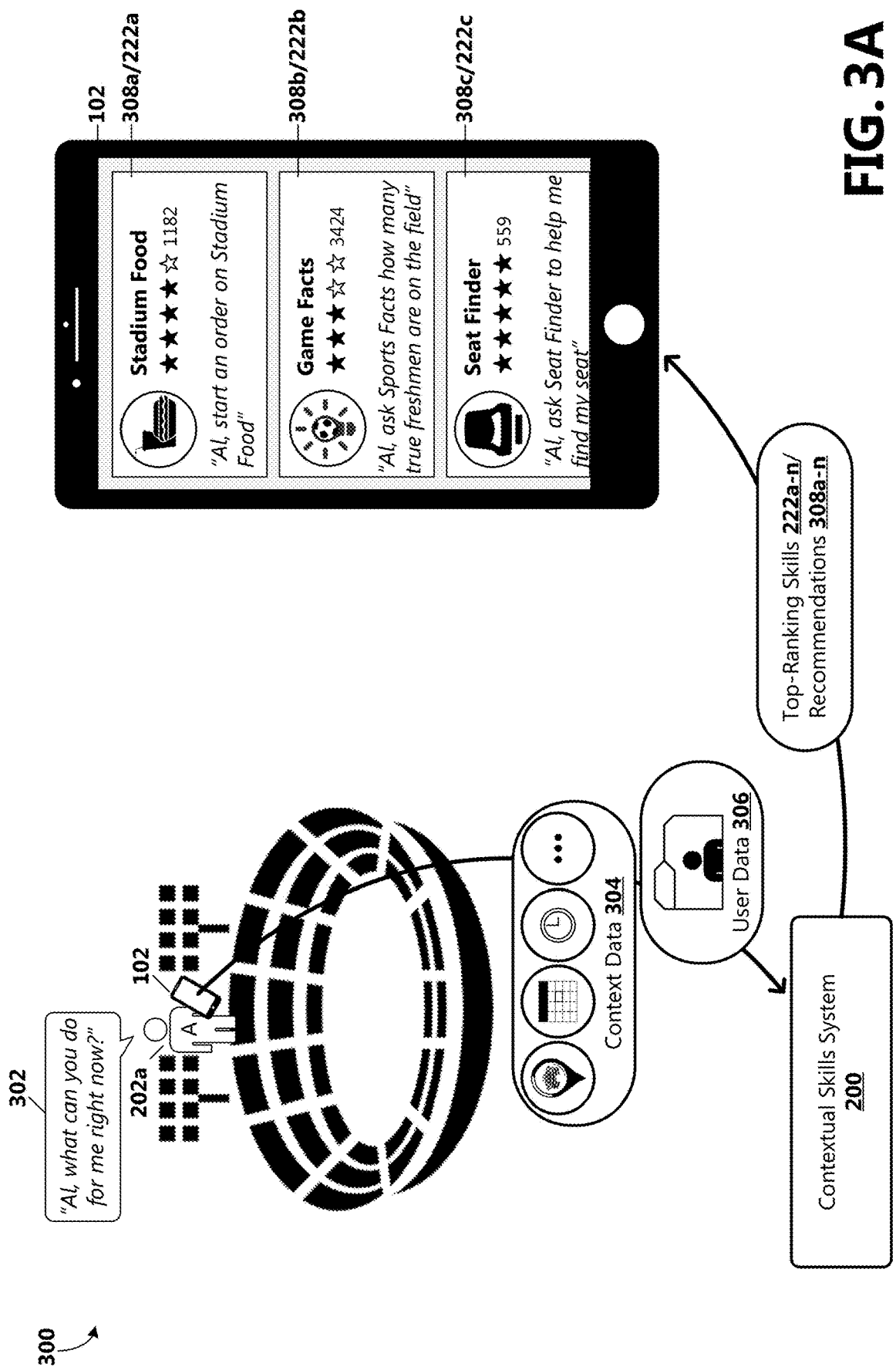

With reference now to FIGS. 3A and 3B, an example use case 300 is illustrated. In the illustrated example, a first user 202a is at a sports event that is being held at a stadium. The first user 202a invokes a digital personal assistant 206 and makes an explicit request 302 for relevant skills 222. For example, the first user 202a speaks an utterance, "Al (e.g., wherein "Al" is the name of the digital personal assistant 206 and wherein "Al" invokes the digital personal assistant 206), what can you do for me right now?" According to an aspect, the spoken utterance is detected as a trigger event for the contextual skills system 200. In other examples, a trigger event in the user's context can include noteworthy events (e.g., touchdowns, goals, red cards, substitutions, etc.) that occur in the sports event that the user 202 is watching or in other games in which the user 202 has an interest. The data collector 212 collects context data 304 associated with the user's current context. For example, the data collector 212 can collect context data 304 associated with the user's location (e.g., the stadium), the date and the time of day, attributes of the request (e.g., the user's emotional state, wording of the utterance), etc. Further, the data collector 212 can collect user data 306, such as user ID data, user preference data, and other user profile data. The collected data 304,306 are applied to the ML contextual skills model 216, and a ranked list of skills 222 that are relevant to the first user 202a and that appropriate for the user's current context is generated. As illustrated, top-ranking skills 222 are provided to the first user 202a as skills recommendations 308 responsive to the request 302. Although the skills 222 are shown displayed on a screen of the user's client computing device 102 in the illustrated example, in other examples, top-ranking skill recommendations 308 can be presented to the user 202 as audio output played through a speaker integrated with or in communication with the client computing device 102.

With reference now to FIG. 3B, a second user 202b is at the sports event that is being held at the stadium. The second user 202b also invokes a digital personal assistant 206 and makes a request 302 for relevant skills 222 that is detected as a trigger event for the contextual skills system 200. Accordingly, the data collector 212 collects context data 304 associated with the user's current context and user data 306. The collected data 304,306 are applied to the ML contextual skills model 216, and a ranked list of skills 222 that are relevant to the second user 202b and that are appropriate for the user's current context is generated. As illustrated, the top-ranking skill recommendations 308d,e,f provided to the second user 202b differ from the top-ranking skill recommendations 308a,b,c provided to the first user 202a. According to an example, the second user's top-ranking skill recommendations 308d,e,f can differ based in part on the user's user interaction history and based in part on cohort analysis.

For example, the contextual skills model 216 can group the second user 202b into a particular cohort of users based on collected user data 306, and identify relationships between characteristics of the cohort and the cohort's/group's skills invoking related behavior for determining skills 222 that are relevant to the second user 202b based at least in part on the user's current context. For example, consider that user data 306 collected in association with the second user 202b indicates that the second user 202b is a 30 year old female who is sociable, has a physical disability, and has not attended a sporting event at the stadium. Based on the second user's current context and user data 306, she may be presented with skills recommendations 308 such as an example "Friend Finder" skill 222d that helps the second user 202b to locate contacts, an example "Toilet Finder" skill 222e that helps the second user 202b to locate a bathroom in the stadium that meets specified needs of the second user 202b, and an example "Team Apparel" skill 222f that enables the second user 202b to locate a desired apparel item at or near the stadium. In one example, the skills 222 recommended to the second user 202b can include skills 222 that are determined to be skills 222 that are characteristically used by new visitors of the stadium. For example, cohort analysis can be used not only to identify the skills 222 that a cohort (e.g., new stadium visitors) uses, but also to identify skills 222 that the cohort uses first (e.g., temporally-related skills).

Further, consider that user data 306 collected in association with the first user 202a indicates that the first user 202a is a 50 year old male and identified as a sports fan who does not regularly attend sporting events. Based in part on the collected user data 306, the contextual skills model 216 can group the first user 202a into a particular cohort of users, and identify relationships between characteristics of the cohort and the cohort's/group's behavior related to invoking skills 222 for determining skills 222 that are relevant to the first user 202a based at least in part on the collected context data 304 that characterizes the first user's current context. Accordingly, responsive to a trigger event (e.g., the first user's explicit request 302 embodied as a spoken utterance in the example use case 300), the first user 202a is presented with recommendations 308 of skills 222a,b,c that are relevant to the first user 202a and that are determined to be skills 222 that are most-likely to be invoked by the first user 202a based on the first user's current context. For example, based on the first user's current context and user data 306, he may be presented with skills recommendations 308 such as an example "Stadium Food" skill 222a that enables the first user 202a to order food or drinks and have it delivered to his seat, an example "Sports Facts" skill 222b that enables the first user 202a to submit queries for sports-related information, and an example "Seat Finder" skill 222c that helps the first user 202a find his seat. As should be appreciated, the above-mentioned use case 300 and skills 222 are for illustrative purposes only.

Figure 4A:
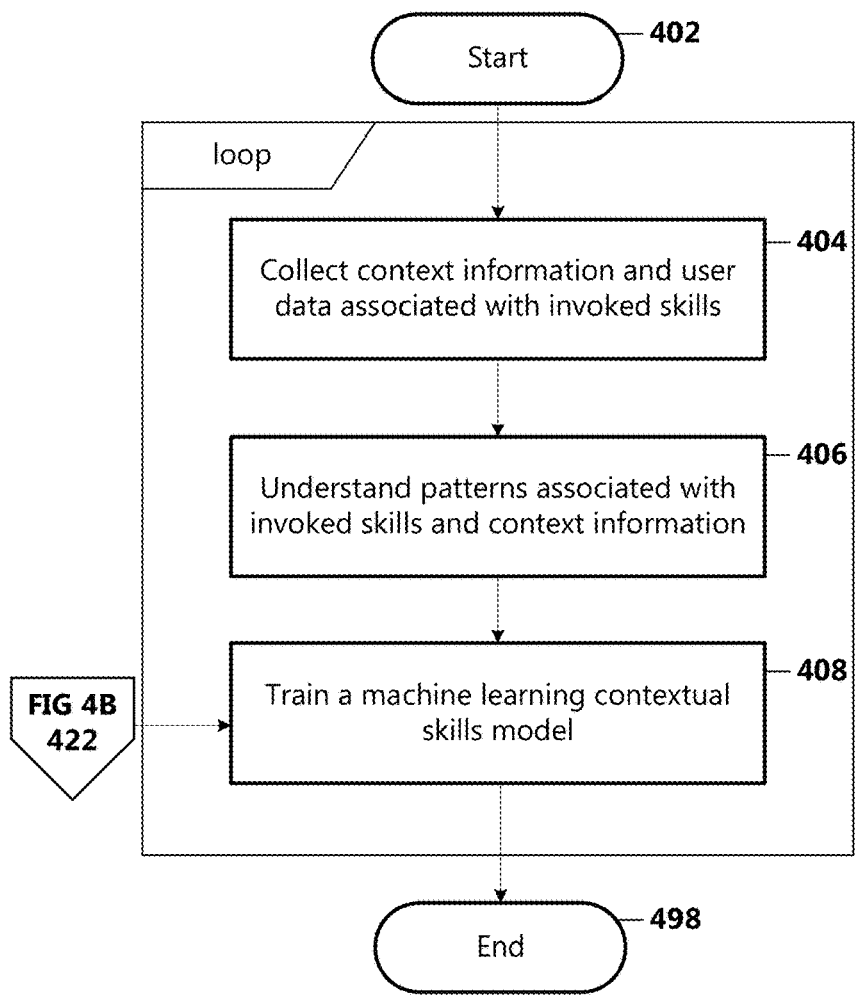
FIG. 4A is a flow chart showing general stages involved in an example method for training a machine learning contextual skills model.

Having described an example operating environment 100, an example computing architecture, and an example use case 300 with respect to FIGS. 1-3B, FIGS. 4A and 4B are flow charts showing general stages involved in example methods 400,450 for training and using a contextual skills model 216 for recommending skills 222 to a user 202 based on context. With reference now to FIG. 4A, the method 400, which in some examples is executed as an offline process, begins at start OPERATION 402, and proceeds to OPERATION 404, where data are collected that are associated with skills 222 that have been invoked by various users 202. For example, the collected data can include a particular skill 222 invoked by a user 202, information about the user 202 (e.g., user data 306), and context data 304 that captures characteristics of the context of the user 202, the user's client computing device 102, and the user's environment in association with the invoked skill 222.

The method 400 proceeds to OPERATION 406, where the collected data are provided to an ML algorithm, and machine learning, statistical analysis, behavioral analytics, and data mining techniques are applied to the data for training (OPERATION 408) an ML contextual skills model 216. For example, in training the contextual skills model 216, the model training engine 214 finds patterns in the context data 304 and user data 306 that map various combinations of context data attributes and user data attributes to invoked skills 222, and captures the identified patterns in the contextual skills model 216. In some examples, cohort analysis is performed to train the contextual skills model 216 to identify relationships between characteristics of a cohort and the cohort's/group's behaviors with respect to invoking skills 222 in particular contexts. The method 400 ends at OPERATION 498.

Figure 4B:
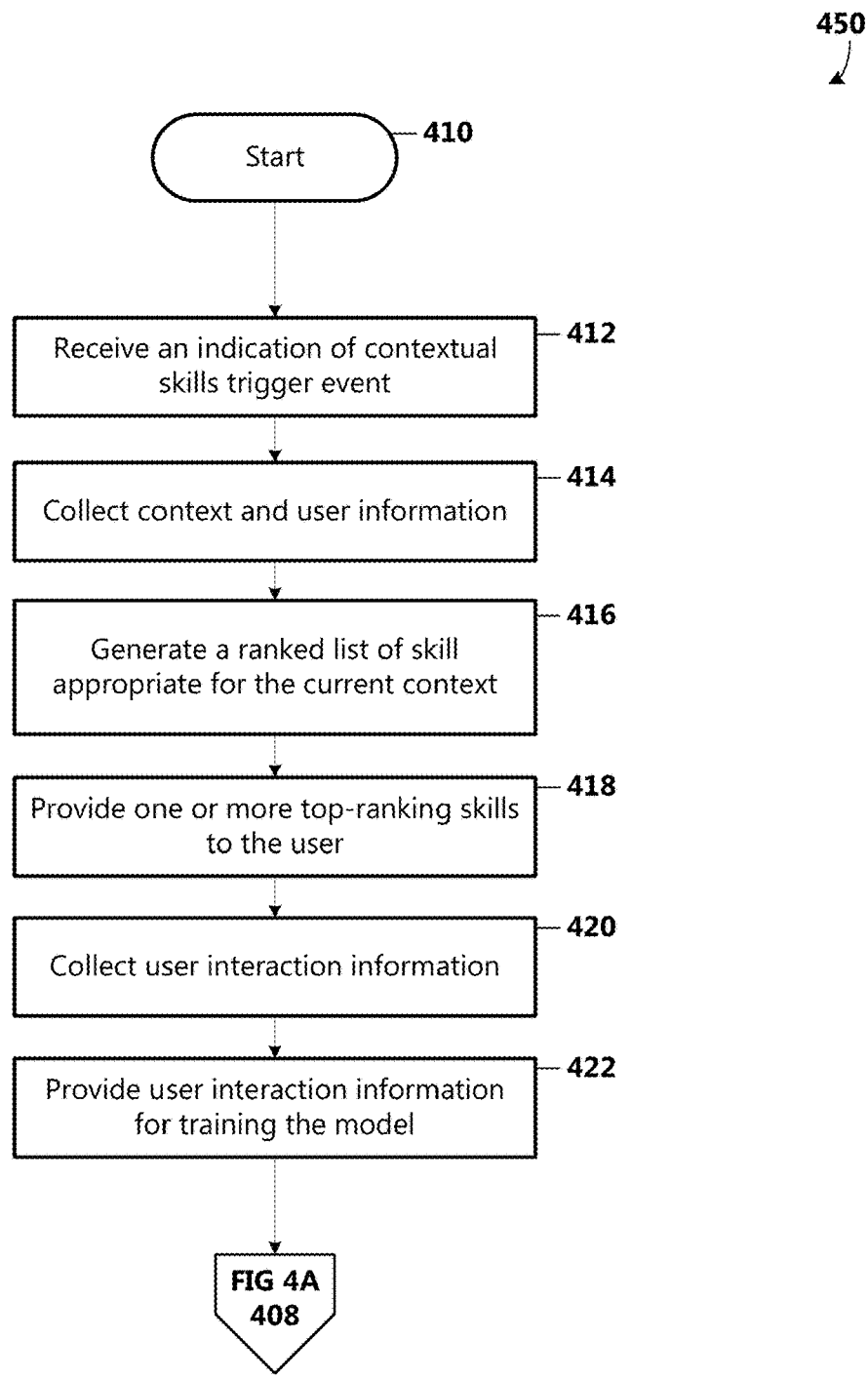
FIG. 4B is a flow chart showing general stages involved in an example method for providing a user of one or more skills appropriate for the user's current context.

With reference now to FIG. 4B, the method 450, which is executed as an online process, begins at start OPERATION 410, and proceeds to OPERATION 412, where an indication of a contextual skills trigger event is received. For example, the event engine 218 receives an indication of an event that operates as a signal to determine and provide one or more contextual skill recommendations 308 to a particular user 202. In some examples, the event is an explicit user request (e.g., spoken utterance, input text, a touch, a selection, an action) via a client computing device 102. In other examples, the event is an inferred request (e.g., based on application usage, online activity, a search query). In other examples, the event is an external event (e.g., a calendar item, breaking news, popular or trending items on search engines or social networks, etc.). In other examples, the event is a detection of the user's current context (e.g., the user's location, the date, the time of day, interaction with a particular person).

The method 450 proceeds to OPERATION 414, where context data 304 and user data 306 are collected and fed into the contextual skills model 216 trained in method 400. At OPERATION 416, a ranked list of skills 222 is generated and a top-ranking one or more skills 222 are selected as one or more recommendations 308 of skills 222 that are relevant to the user 202 and that are inferred to be relevant to the user's current context. As described above, in some examples, certain skills 222 can be prioritized based on a detected level of urgency of a received user request or a detected emotional state of the user 202. The skills 222 includes various skills 222 made available by a plurality of skill providers 204, including skill providers 204 that are local on the user's client computing device 102 and web-based skill providers 204.

The method 450 continues to OPERATION 418, where the one or more top-ranking skills 222 are provided as one or more skills recommendations 308 to the user 202. In some examples, the skills recommendations 308 are displayed in a GUI on a display screen integrated with or communicatively attached to the user's client computing device 102 and/or played as audio output via a speaker integrated with or communicatively attached to the user's client computing device 102. Accordingly, the user 202 is enabled to discover available skills 222 that are relevant to the user 202 and relevant to the current context.

The method 450 proceeds to OPERATION 420, where the learning engine 220 collects recommended skills data, context data 304, and user interaction data, such as application usage data, online activity data, search data, voice data (e.g., automatic speech recognition data), activity logs, etc., and analyzes the collected data for identifying whether the user 202 or whether other users invoked a skill 222 that was recommended to them, or whether the user 202 or other users declined to invoke a recommended skill 222.

The method 450 continues to OPERATION 422, where the learning engine 220 passes collected recommended skills data, context data 304, user data 306, and user interaction data to the model training engine 214. Method 450 then returns to OPERATION 422 of method 400, in which the model training engine 214 applies machine learning, statistical analysis, behavioral analytics, and data mining techniques to the received data for continuing to learn which skills 222 are relevant to a particular user 202, to a cohort in certain contexts, or to the general population, and to continue to learn which skills 222 are not relevant to a particular user 202 or to a cohort in certain contexts. The method 450, via method 400, ends at OPERATION 498.

While implementations have been described in the general context of program modules that execute in conjunction with an application program that runs on an operating system on a computer, those skilled in the art will recognize that aspects can also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
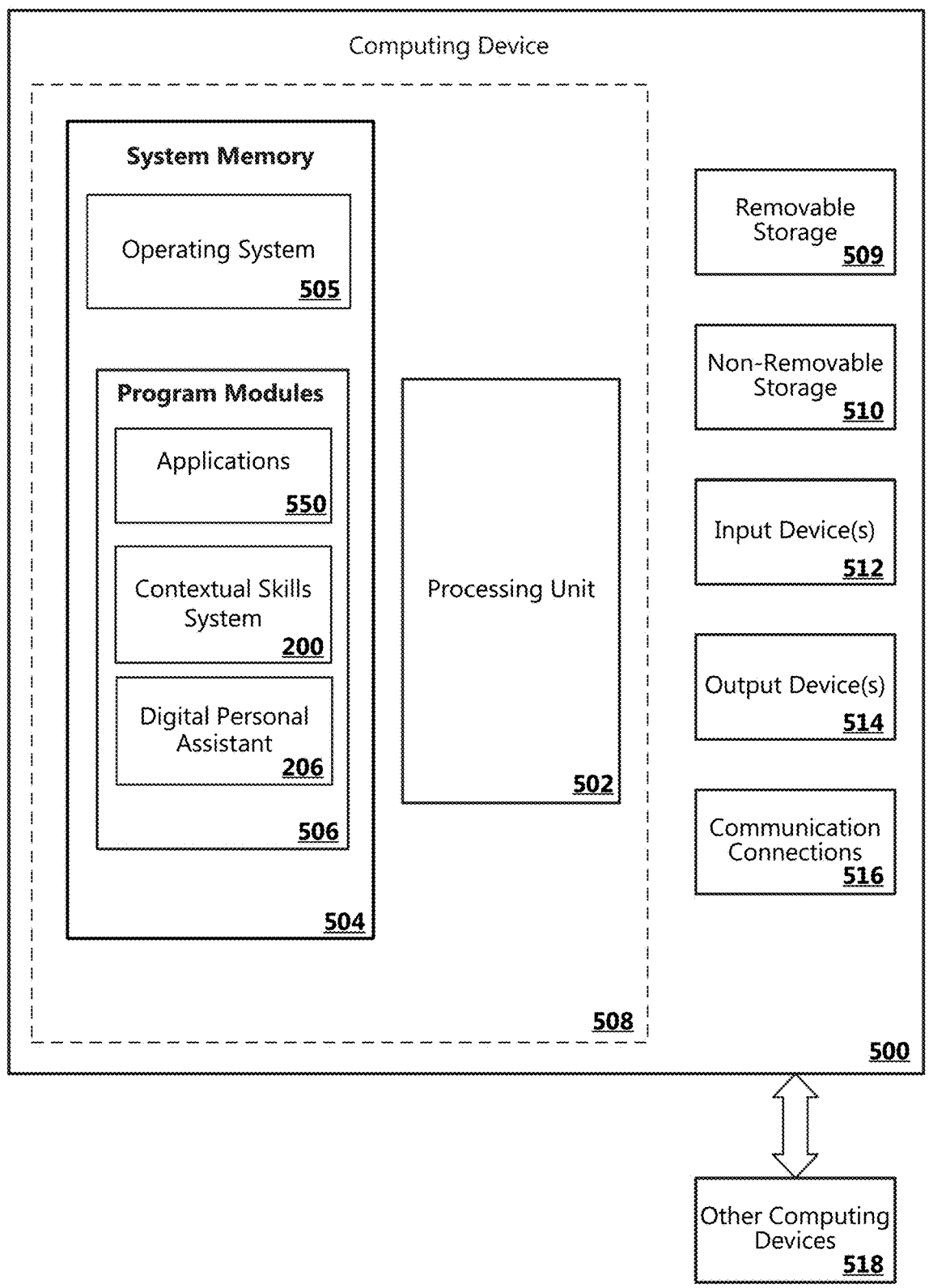
FIG. 5 is a block diagram illustrating example physical components of a computing device.
Figure 6A:
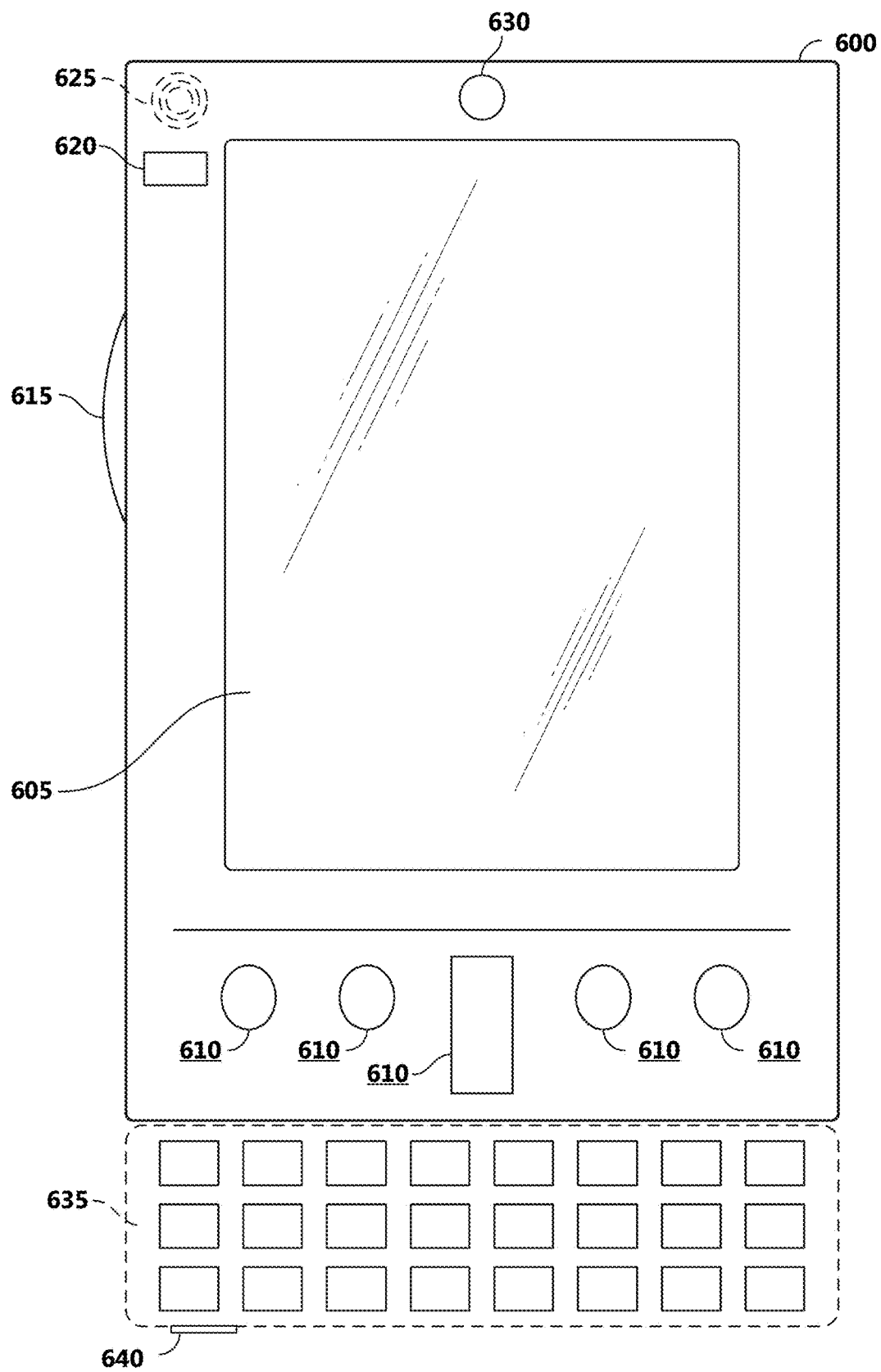
FIGS. 6A and 6B are simplified block diagrams of a mobile computing device.
Figure 6B:
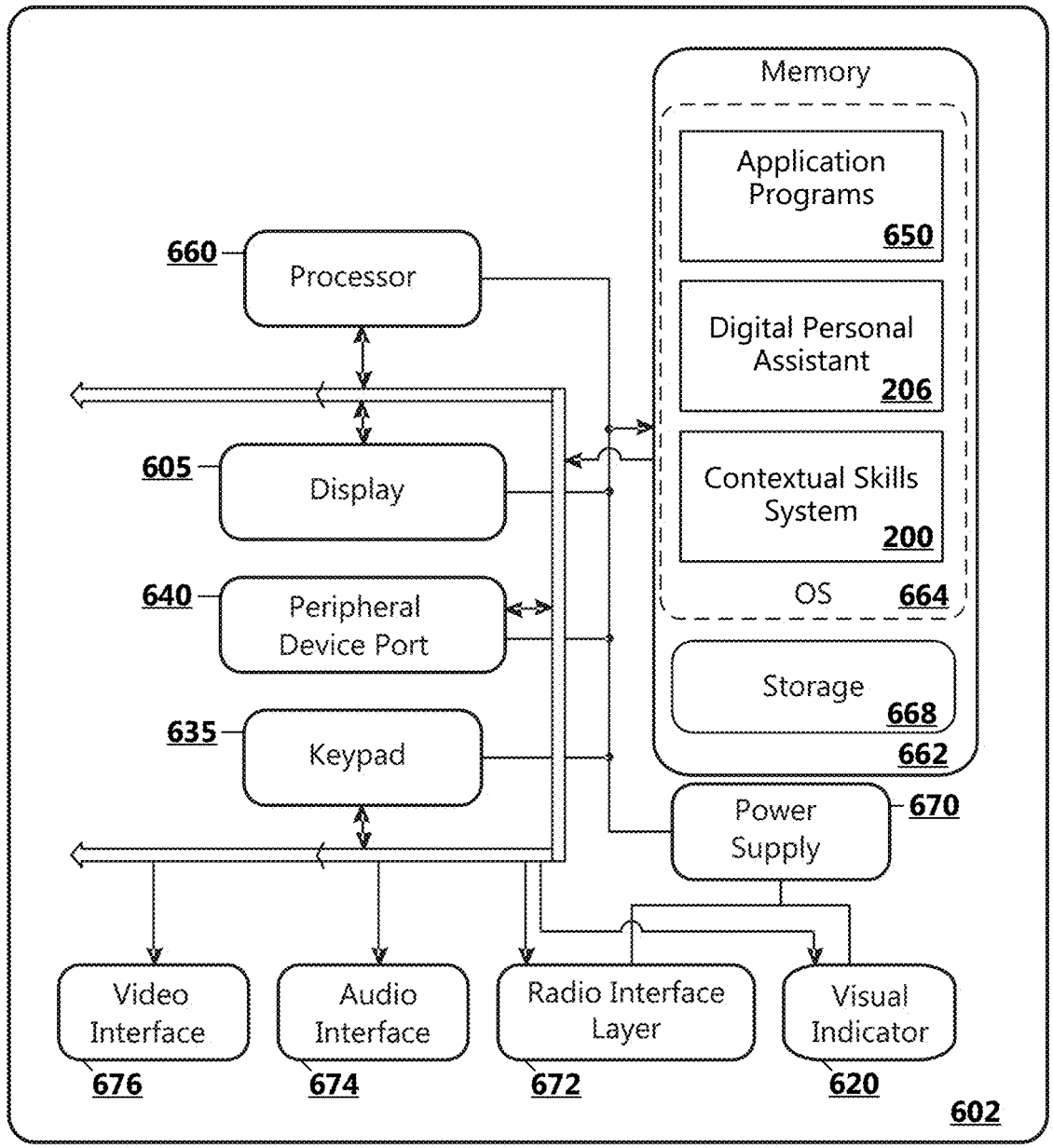
Figure 7:
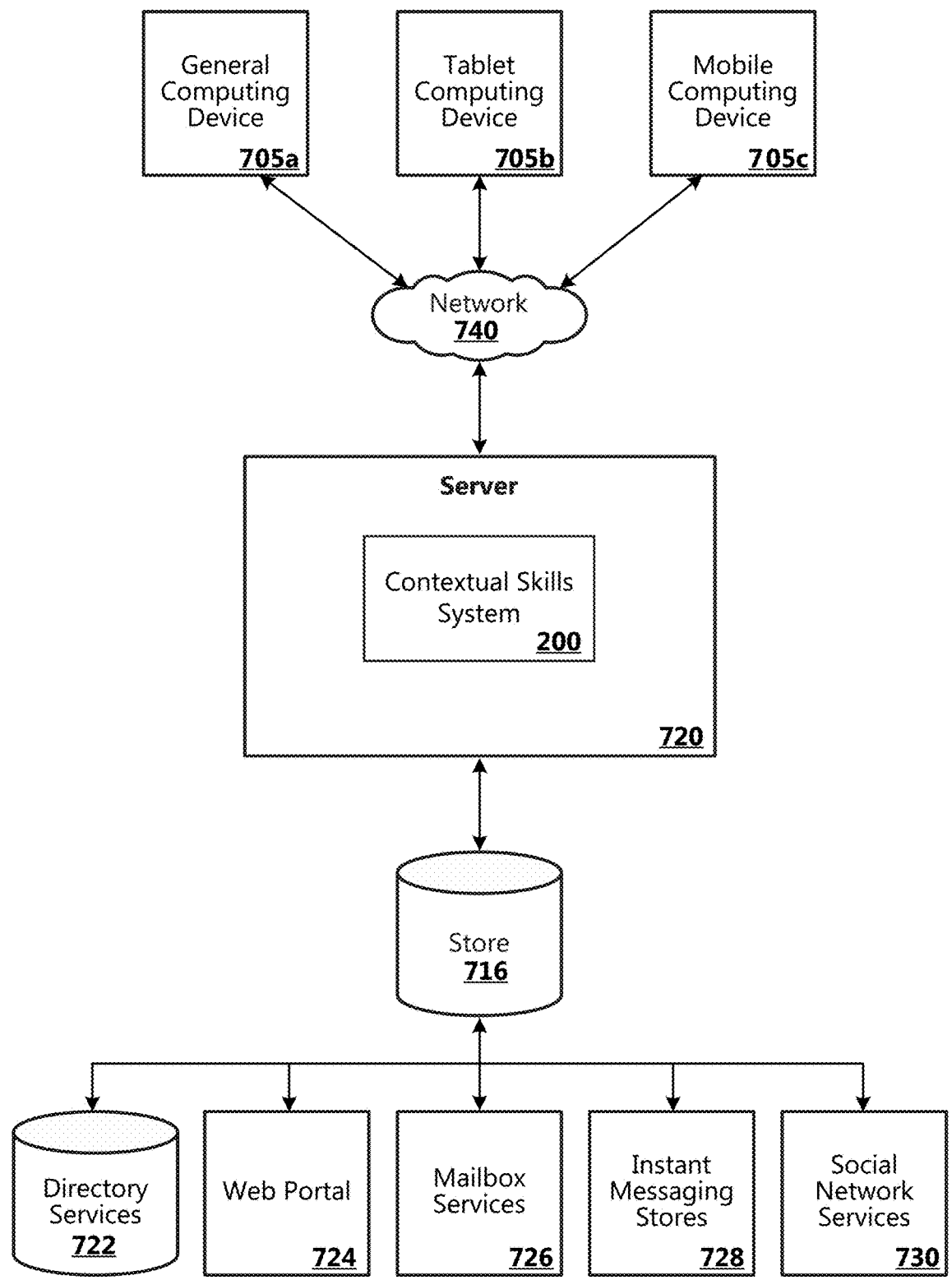
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the one or more components of the contextual skills system 200. According to another aspect, the system memory 504 includes the digital personal assistant 206. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., one or more components of the contextual skills system 200, the digital personal assistant 206) perform processes including, but not limited to, one or more of the stages of the method 400 illustrated in FIGS. 4A and 4B. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, one or more components of the contextual skills system 200 are loaded into memory 662. According to another aspect, the digital personal assistant 206 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for training and using a contextual skills model 216 for recommending skills 222 to a user 202 based on context as described above. Content developed, interacted with, or edited in association with the one or more components of the contextual skills system 200 is enabled to be stored in different communication channels or other storage types. For example, various documents may be stored using a directory service 722, a web portal 724, a mailbox service 726, an instant messaging store 728, or a social networking site 730. One or more components of the contextual skills system 200 are operative or configured to use any of these types of systems or the like for training and using a contextual skills model 216 for recommending skills 222 to a user 202 based on context, as described herein. According to an aspect, a server 720 provides the one or more components of the contextual skills system 200 to clients 705a,b,c. As one example, the server 720 is a web server providing one or more components of the contextual skills system 200 over the web. The server 720 provides one or more components of the contextual skills system 200 over the web to clients 705 through a network 740. By way of example, the client computing device is implemented and embodied in a personal computer 705a, a tablet computing device 705b or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A system for recommending a skill to a user, the system comprising:
    at least one processing device; and
    at least one computer readable data storage device storing instructions that, when executed by the at least one processing device, cause the system to:
        train a machine learning model based on invoked skills data comprising a plurality of skills associated with a digital assistant that are invoked by at least one of a user and one or more other users and corresponding context data associated with the at least one of the user and the one or more other users when the plurality of skills are invoked;
        detect an indication of a trigger event corresponding to a request for a skill associated with the digital assistant that is executing at least partially on a computing device of the user;
        access context data associated with a current context of the user;
        process the context data, by the trained machine learning model, to determine one or more skills, from the plurality of skills associated with the digital assistant, that the user is likely to invoke based on the current context of the user; and
        present, via the computing device of the user, the one or more of the skills determined by the trained machine learning model as one or more recommendations to the user.

2. The system of claim 1, wherein in accessing the context data, the system is operative or configured to receive one or more of:
    location information of the computing device of the user;
    properties and characteristics of the computing device of the user;
    user interaction information;
    attributes of the trigger event; and
    user-related data sensed via one or more sensors in association with the client computing device of the user, one or more data sources, or one or more servers.

3. The system of claim 1, wherein the system is further operative or configured to collect user data associated with at least one of:
    an identity of the user;
    user preferences; and
    user settings.

4. The system of claim 1, wherein to train the machine learning model, the system is operative or configured to:
    in addition to the invoked skills data and the corresponding context data, collect user data associated with at least one of the user and the one or more other users;
    apply machine learning, statistical analysis, behavioral analytics, and data mining techniques to the invoked skills data, the corresponding context data, and the user data; and
    identify patterns in the corresponding context data and the user data that map context and user data attributes to the invoked plurality of skills, wherein the identified patterns are used to determine the one or more skills that that the user is likely to invoke based on the current context of the user.

5. The system of claim 4, wherein to train the machine learning model, the system is further operative or configured to:
    group the user in a cohort with at least one of the one or more other users based on one or a combination of common characteristics; and
    identify relationships between the one or the combination of common characteristics of the cohort and behavior of the cohort with respect to invoking skills associated with the digital assistant in particular contexts.

6. The system of claim 5, wherein, when two or more skills are determined that the user is likely to invoke based on the current context of the user, the system is further operative or configured to rank the two or more skills, wherein in ranking the two or more skills, the system is operative or configured to rank the two or more skills based at least in part on the current context of the user and the behavior of the cohort with respect to invoking skills in similar contexts.

7. The system of claim 1, wherein, when two or more skills are determined that the user is likely to invoke based on the current context of the user, the system is further operative or configured to rank the two or more skills, wherein in ranking the two or more skills, the system is operative or configured to rank the two or more skills based at least in part on a match between skill metadata and textual features representing aspects of the current context of the user.

8. The system of claim 1, wherein the plurality of skills associated with the digital assistant provide one or more functionalities selected from a group comprising:
    functionalities for interacting with the user;
    functionalities for performing a task;
    functionalities for providing a service;
    functionalities for gathering information; and
    functionalities for operating the computing device of the user.

9. The system of claim 8, wherein the plurality of skills associated with the digital assistant include one or more of:
    entertainment-related skills;
    productivity-related skills;
    finance-related skills;
    relaxation-related skills;

news and information-related skills;
smart home-related skills;
health and fitness-related skills;
music-related skills;
food and drink-related skills;
education-related skills, and
travel-related skills.

10. The system of claim 1, wherein in presenting, via the computing device of the user, the one or more of the skills determined by the trained machine learning model as the one or more recommendations to the user, the system is operative to present the one or more of the skills via at least one of:
  a graphical user interface on a display screen associated with the computing device of the user; and
  an audio interface played through a speaker associated with the computing device of the user.

11. The system of claim 1, wherein in detecting the indication of the trigger event corresponding to the request, the system is operative or configured to detect one of:
  an indication of an explicit user request;
  an indication of an external event;
  an indication of an inferred request based on captured user interaction data; and
  an indication of attributes of the current context of the user.

12. The system of claim 1, wherein the system is further operative to:
  collect recommendation data associated with the one or more of the skills presented as the one or more recommendations to the user;
  collect user interaction data, including which of the one or more of the skills are invoked by the user and which are not; and
  apply machine learning techniques to the recommendation data, the user interaction data, and the current context of the user for learning new patterns and for adjusting existing patterns based on a growing data set.

13. The system of claim 1, wherein the plurality of skills associated with the digital assistant include at least one of:
  skills that are enabled on the computing device of the user; and
  skills that are provided in a skill store accessible via the computing device of the user.

14. A computer-implemented method for recommending a skill to a user, comprising:
  training a machine learning model based on invoked skills data comprising a plurality of skills associated with a digital assistant that are invoked by at least one of a user and one or more other users and corresponding context data associated with the at least one of the user and the one or more other users when the plurality of skills are invoked;
  detecting an indication of a trigger event corresponding to a request for a skill associated with the digital assistant that is executing at least partially on a computing device of the user, wherein the trigger event comprises one or more of:
    an explicit user request;
    an external event;
    an inferred request based on captured user interaction data; and
    a current context of the user;
  accessing context data associated with the current context of the user;
  processing the context data, by the trained machine learning model, to determine one or more skills, from the plurality of skills associated with the digital assistant, that the user is likely to invoke based on the current context of the user; and
  presenting, via the computing device of the user, the one or more of the skills determined by the trained machine learning model as one or more recommendations to the user.

15. The method of claim 14, wherein training the machine learning model comprises:
  in addition to the invoked skills data and the corresponding context data, collecting user data associated with at least one of the user and the one or more other users;
  applying machine learning, statistical analysis, behavioral analytics, and data mining techniques to the invoked skills data, the corresponding context data, and the user data; and
  identifying patterns in the corresponding context data and the user data that map context and user data attributes to the invoked plurality of skills, wherein the identified patterns are used to determine the one or more skills that that the user is likely to invoke based on the current context of the user.

16. The method of claim 15, wherein training the machine learning model further comprises:
  grouping the user in a cohort with at least one of the one or more other users based on one or a combination of common characteristics; and
  identifying relationships between the one or the combination of common characteristics of the cohort and behavior of the cohort with respect to invoking skills associated with the digital assistant in particular contexts.

17. The method of claim 16, wherein two or more skills are determined that the user is likely to invoke based on the current context of the user, and the method further comprises:
  ranking the two or more skills based at least in part on the current context of the user and the behavior of the cohort with respect to invoking skills in similar contexts.

18. The method of claim 14, wherein presenting, via the computing device of the user, the one or more of the skills determined by the trained machine learning model as the one or more recommendations to the user comprises one or a combination of:
  presenting the one or more of the skills in a graphical user interface on a display screen associated with the computing device of the user; and
  presenting the one or more of the skills via an audio interface played through a speaker associated with the computing device of the user.

19. The method of claim 14, further comprising:
  collecting recommendation data associated with the one or more of the skills presented as the one or more recommendations to the user;
  collecting user interaction data, including which of the one or more of the skills are invoked by the user and which are not; and
  applying machine learning techniques to the recommendation data, the user interaction data, and the current context of the user for learning new patterns and for adjusting existing patterns based on a growing data set.

20. A computer readable storage device including computer readable instructions, which when executed by a processing unit is operative to:
  train a machine learning model based on invoked skills data comprising a plurality of skills associated with a digital assistant that are invoked by at least one of a user and one or more other users, corresponding context data associated with the at least one of the user and the one or more other users when the plurality of skills are invoked, and user data associated with the at least one of the user and the one or more other users;

detect an indication of a trigger event corresponding to a request for a skill associated with the digital assistant that is executing at least partially on a computing device of the user;

access context data associated with a current context of the user;

process the context data, by the trained machine learning model, to determine one or more skills, from the plurality of skills associated with the digital assistant, that the user is likely to invoke based on the current context of the user; and present, via the computing device of the user, the one or more of the skills determined by the trained machine learning model as one or more recommendations to the user.

* * * * *